(12) United States Patent
Kwon

(10) Patent No.: US 7,814,199 B2
(45) Date of Patent: Oct. 12, 2010

(54) METHOD AND APPARATUS FOR SEARCHING FOR UPNP DEVICE

(75) Inventor: Won-seok Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 11/967,320

(22) Filed: Dec. 31, 2007

(65) Prior Publication Data

US 2008/0301289 A1    Dec. 4, 2008

(30) Foreign Application Priority Data

May 30, 2007    (KR) .................... 10-2007-0052922

(51) Int. Cl.
*G06F 15/173*    (2006.01)
(52) U.S. Cl. ..................................... 709/224
(58) Field of Classification Search .................. 709/224
See application file for complete search history.

(56) References Cited

U.S. PATENT DOCUMENTS

2003/0093769 A1   5/2003   Kumar

2004/0083303 A1 *   4/2004   Hwang ........................ 709/232

FOREIGN PATENT DOCUMENTS

KR    1020070042001 A    4/2007

* cited by examiner

*Primary Examiner*—Shawki S Ismail
(74) *Attorney, Agent, or Firm*—Sughrue Mion, PLLC

(57) ABSTRACT

Provided is a method of searching for a Universal Plug and Play (UPnP) device in a UPnP network. Accordingly, a control point inserts attribute information on a device designated by a user in addition to information on a device type, a service type, or the like into a search message that is multicasted to search for a UPnP message, and a UPnP device which receives the search message determines whether or not the received attribute information corresponds to an attribute of the UPnP device with reference to a device description and a service description, and transmits a response message according to a result of the determining. Therefore, network traffic that occurs in an operation of searching for a UPnP device can be reduced, and a user can easily and rapidly search for a desired UPnP device.

7 Claims, 6 Drawing Sheets

FIG. 1A (RELATED ART)

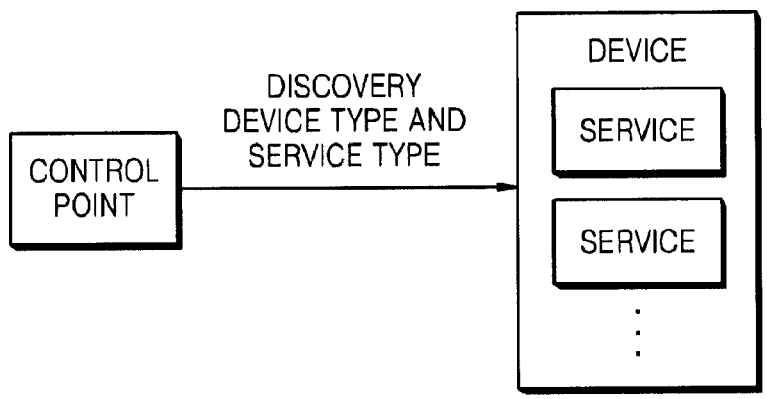

FIG. 1B (RELATED ART)

```
M-SEARCH * HTTP/1.1
HOST: 239.255.255.250:1900
MAN: "ssdp:discover"
MX: seconds to delay response
ST: search target
USER-AGENT: OS/version UPnP/1.1 product/version
```

FIG. 1C (RELATED ART)

ssdp:all - Search for all devices and services.
upnp:rootdevice - Search for root devices only.
uuid:device-UUID - Search for a particular device.
urn:schemas-upnp-org:device:deviceType:v - Search for any device of this type. Device type and version defined by UPnP Forum working committee.
urn:schemas-upnp-org:service:serviceType:v - Search for any service of this type. Service type and version defined by UPnP Forum working committee.

M-SEARCH * HTTP/1.1
HOST: 239.255.255.250:1900
MAN: "ssdp:discover"
MX: seconds to delay response
ST: search target
SA: search attribute
USER-AGENT: OS/version UPnP/1.1 product/version

[MESSAGE SYNTAX] SA: Attribute_Name_1="Attribute_Value",
Attribute_Name_2="Attribute_Value"
[MESSAGE SYNTAX EXAMPLE] SA: FriendlyName=MyPhone, Location=Den

[MESSAGE SYNTAX] ST: search target, Attribute_Name_1="Attribute_Value", Attribute_Name_2="Attribute_Value"
[MESSAGE SYNTAX EXAMPLE] ST: schemas-upnp-org:device:MediaServer:2, FriendlyName=MyPhone, Location=Den

FIG. 8A

```
<?xml version="1.0"?>
<root xmlns="urn:schemas-upnp-org:device-1-0" configId="configuration number">
<specVersion>
<major>1</major>
<minor>1</minor>
</specVersion>
<device>
<deviceType>urn:schemas-upnp-org:device:MediaServer:2</deviceType>
<friendlyName>Media Server in Alan's room</friendlyName>
<manufacturer>Samsung Electronics</manufacturer>
<manufacturerURL>http://www.sec.com</manufacturerURL>
<modelDescription>NG Media Server with LP Cap.</modelDescription>
<modelName>NGMS01 </modelName>
<modelNumber>AC3</modelNumber>
<modelURL>http://www.sec.com/ac3.asp</modelURL>
<serialNumber>34123</serialNumber>
<UDN>uuid:abcd-1234-12345678-abcd</UDN>
<UPC>guid01</UPC>
<serviceList>
   ...
</serviceList>
</device>
</root>
```

FIG. 8B

```
M-SEARCH * HTTP/1.1
HOST: 239.255.255.250:1900
MAN: "ssdp:discover"
MX: 5
ST: schemas-upnp-org:device:MediaServer:2
SA: friendlyName="Media Server in Alan's Room"
USER-AGENT: Windows/XP UPnP/1.1 UPnP/3.0
```

METHOD AND APPARATUS FOR SEARCHING FOR UPNP DEVICE

CROSS-REFERENCE TO RELATED PATENT APPLICATION

This application claims priority from Korean Patent Application No. 10-2007-0052922, filed on May 30, 2007, in the Korean Intellectual Property Office, the disclosure of which is incorporated herein in its entirety by reference.

BACKGROUND OF THE INVENTION

1. Field of the Invention

The present invention relates to a home network, and more particularly, to a method of searching for a Universal Plug and Play (UPnP) device in a UPnP network.

2. Description of the Related Art

A Universal Plug and Play (UPnP) communication protocol used for communication between devices in a home network is a standard for analyzing a message set by a simple object access protocol (SOAP) form on the basis of Internet protocol (IP) packets and analyzing attributes and control information on a device.

In order for a control point to control a UPnP device that is a controlled device connected to a UPnP network, a discovery operation has to be performed. As illustrated in FIG. 1A, the control point has to search for and discovers a UPnP device connected to the UPnP network by using a device type or a service type of the UPnP device. To do this, the control point uses a multicast-search (M-Search) message.

FIG. 1B illustrates a related art structure of the M-Search message. As illustrated in FIG. 1B, the M-Search message includes a <ST> (search target) header, and a <ST> header value includes information on a search condition.

FIG. 1C illustrates related art search conditions that can be used as the <ST> header value of the M-Search message. Specifically, a header value ssdp:all corresponds to a case of searching for all devices and services, a header value upnp:rootdevice corresponds to a case of searching only for a root device, a header value uuid:device-Universally Unique Identifier (UUID) corresponds to a case of searching for a device having a particular UUID, and header values urn:schemas-upnp-org: device: deviceType: v and urn:schemas-upnp-org: service:serviceType:v correspond to cases of searching for a device and a service having a type defined by the UPnP Forum working committee, respectively.

According to the related art method as described above, a user has to set a type of a device or a type of a service to a search condition to search only for a device corresponding to the search condition, and in order to search for a device having an attribute desired by the user, the user has to acquire and analyze a device description or a service description for the same kind of the device or the same kind of the service.

This may cause inconvenience to the user who wants to search only for a device having a particular attribute in a home network including many UPnP devices, and there is a problem in that a large amount of network traffic occurs.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Methods and apparatuses consistent with the present invention relate to effectively searching for a Universal Plug and Play (UPnP) device that a user wants to search for by inserting attribute information on a device of a service into a search message that is used to search for a UPnP device.

According to an aspect of the present invention, there is provided a method of searching for a Universal Plug and Play (UPnP) device, comprising: generating a search message including information indicating one or more attributes of the UPnP device; and multicasting the generated search message to a UPnP network.

The search message may be a Multicast-search (M-Search) ( ) message.

The information indicating the attributes may indicate a name of the attribute by using a tag name used in a device description or a service description.

The information indicating the attributes may be included in an Search Target (ST) header of the M-Search message.

According to another aspect of the present invention, there is provided a computer-readable medium having embodied thereon a computer program for executing a method of searching for a Universal Plug and Play (UPnP) device, comprising: generating a search message including information indicating one or more attributes of the UPnP device; and multicasting the generated search message to a UPnP network.

According to another aspect of the present invention, there is provided an apparatus for searching for a UPnP device, comprising: a search message generator generating a search message including information indicating one or more attributes of the UPnP device; and a transmitter multicasting the generated search message to a UPnP network.

According to another aspect of the present invention, there is provided a method of processing a search message received by a UPnP device, comprising: extracting attribute information from the search message; comparing the extracted attribute information with a device description or a service description of the UPnP device; and selectively transmitting a response message for the search message according to a result of the comparing.

The search message may be an M-Search message.

The extracting may be performed with reference to an ST header of the M-Search message.

In comparing, a value of a tag having the same name as a tag name included in the attribute information from among tags in the device description or in the service description may be compared with an attribute value included in the attribute information.

According to another aspect of the present invention, there is provided a computer-readable medium having embodied thereon a computer program for executing a method of processing a search message received by a UPnP device, comprising: extracting attribute information from the search message; comparing the extracted attribute information with a device description or a service description of the UPnP device; and selectively transmitting a response message for the search message according to a result of the comparing.

According to another aspect of the present invention, there is provided an apparatus for processing a search message received by a UPnP device, comprising: an attribute information extractor extracting attribute information from the search message; a comparator comparing the extracted attribute information with a device description or a service description of the UPnP device; and a transmitter selectively transmitting a response message for the search message according to a result of the comparing.

BRIEF DESCRIPTION OF THE DRAWINGS

The above and other aspects of the present invention will become more apparent by describing in detail exemplary embodiments thereof with reference to the attached drawings in which:

FIGS. 1A to 1C are views for explaining a related art method of searching for a Universal Plug and Play (UPnP) device;

FIGS. 8A and 8B are views illustrating structures of a device description and an M-search message according to an exemplary embodiment of the present invention.

DETAILED DESCRIPTION OF EXEMPLARY EMBODIMENTS OF THE INVENTION

Hereinafter, exemplary embodiments of the present invention will be described in detail with reference to the attached drawings.

Figures 2, 3, 4A:
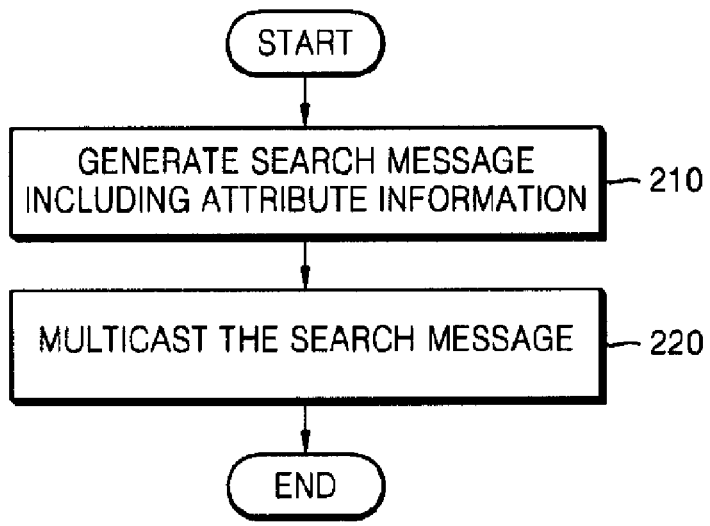
FIG. 2 is a flowchart for explaining a search method according to an exemplary embodiment of the present invention.
FIG. 3 is a view illustrating a structure of a multicast-search (M-search) message according to an exemplary embodiment of the present invention.
FIG. 4A is a view illustrating a form of attribute information according to an exemplary embodiment of the present invention.

FIG. 2 is a flowchart for explaining a search method according to an embodiment of the present invention. In operation 210, a control point generates a search message including attribute information designated by a user. Here, the search message may include any message multicasted by the control point to discover a UPnP device in a UPnP network. In general, the search message may be a multicast-search (M-Search) message. Hereinafter, the M-Search message is used as the search message.

In operation 220, the control point multicasts the generated search message to the UPnP network.

FIG. 3 is a view illustrating a structure of the M-search message according to an exemplary embodiment of the present invention. As illustrated in FIG. 3, according to the embodiment, an <SA> header used for attribute information in the M-search message is newly defined.

An <SA> (search attribute) header value may include information on attributes of a device such as a friendly name and a position of a UPnP device to be searched for.

FIG. 4A is a view illustrating a form of attribute information according to an exemplary embodiment of the present invention.

As illustrated in FIG. 4A, a plurality of pieces of attribute information may be designated as the <SA> header value. A UPnP device which receives an M-search message including the attribute information has to determine whether or not to respond to the message on the basis of the attribute information. To do this, the UPnP device has to perceive an attribute represented by a name in the attribute information. A device description and a service description defined in a UPnP standard are represented by an extensible markup language (XML) document, and various attributes of a device or a service are represented by using a tag. Therefore, as a name representing an attribute, a tag name of the device description or the service description may be used in the search message. The attributes of a service are also attributes of a device providing the service, so that hereinafter, attributes of a device include attributes of a service.

According to the exemplary embodiment illustrated in FIG. 4A, attribute information used to search for a UPnP device in which an attribute "FriendlyName" is "MyPhone" and an attribute "Location" is "Den", is used.

Figures 4B, 5:
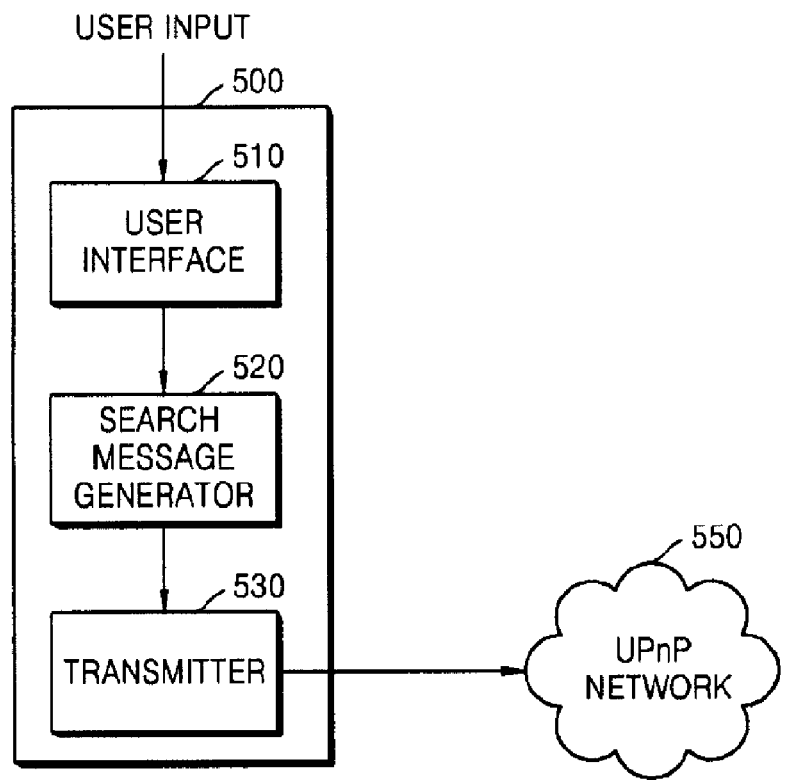
FIG. 4B is a view illustrating a form of attribute information according to another exemplary embodiment of the present invention.
FIG. 5 is a view illustrating a structure of an apparatus for searching for a UPnP device according to an exemplary embodiment of the present invention.

FIG. 4B is a view illustrating a form of attribute information according to another exemplary embodiment of the present invention.

According to the exemplary embodiment illustrated in FIG. 4B, unlike in FIG. 4A, a new header is not defined in the M-Search message, but an existing <ST> header is extended and a value of the <ST> header may be used as attribute information.

FIG. 5 is a view illustrating a structure of an apparatus for searching for a UPnP device according to an exemplary embodiment of the present invention.

Referring to FIG. 5, the search apparatus 500 according to the exemplary embodiment of the present invention includes a user interface 510, a search message generator 520, and a transmitter 530.

The user interface 510 receives a search condition from a user. Specifically, the user can designate an attribute of a UPnP device to be searched for by using the user interface 510.

The search message generator 520 generates a search message based on an input of the user. Here, the generated search message includes attribute information including the search condition designated by the user.

In general, as described above, the search message may be the M-Search message, and the attribute information may be used as the <ST> header existing in the related art M-Search message or a header value of the <SA> header newly defined according to the embodiment of the present invention.

The transmitter 530 multicasts the search message generated by the search message generator 530 to a UPnP network 550.

Figure 6:
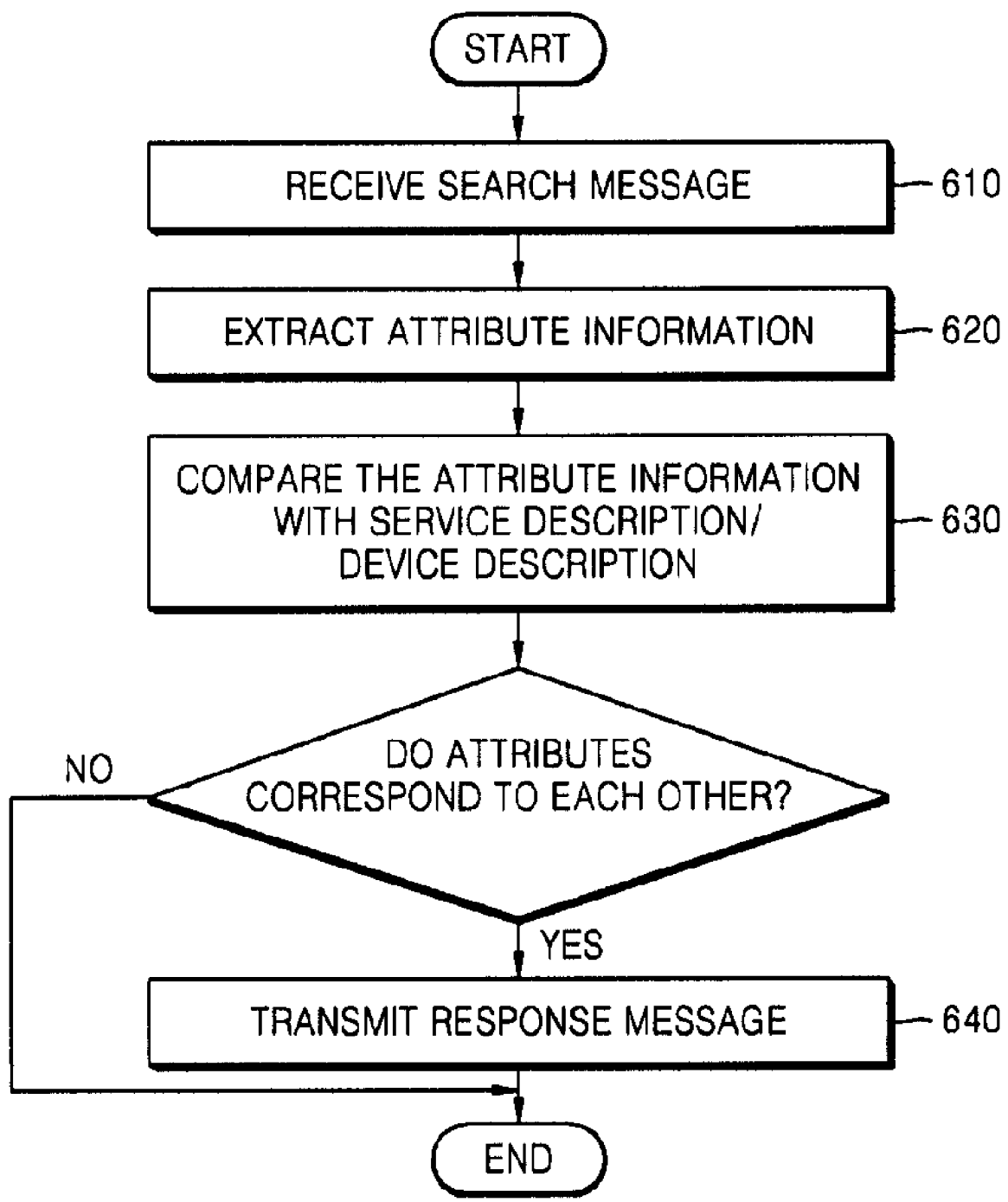
FIG. 6 is a flowchart illustrating operations of processing a search message performed by a UPnP device according to an exemplary embodiment of the present invention.

FIG. 6 is a flowchart illustrating operations of processing a search message performed by a UPnP device according to an embodiment of the present invention.

In operation 610, the UPnP device receives a multicasted search message through a control point.

In operation 620, the UPnP device extracts attribute information from the received search message. When an M-Search message is received, the <ST> header or the <SA> header newly defined according to the exemplary embodiment of the present invention may be used as index information used to extract the attribute information.

In operation 630, the UPnP device compares the extracted attribute information with its own service description or device description. In this case, an attribute name included in the attribute information may be used as index information to search the service description or the device description for a corresponding tag. When the corresponding tag is discovered, a value of an attribute included in the attribute information is compared with the corresponding tag value of the service description or the device description to determine whether or not the value of the attribute is equal to the corresponding tag value. When it is determined to be equal, the device has the attribute desired by the user.

In operation 640, when the UPnP device determines that the attribute desired by the user is equal to its own attribute, the UPnP device transmits a response message for the search message to the control point.

Figure 7:
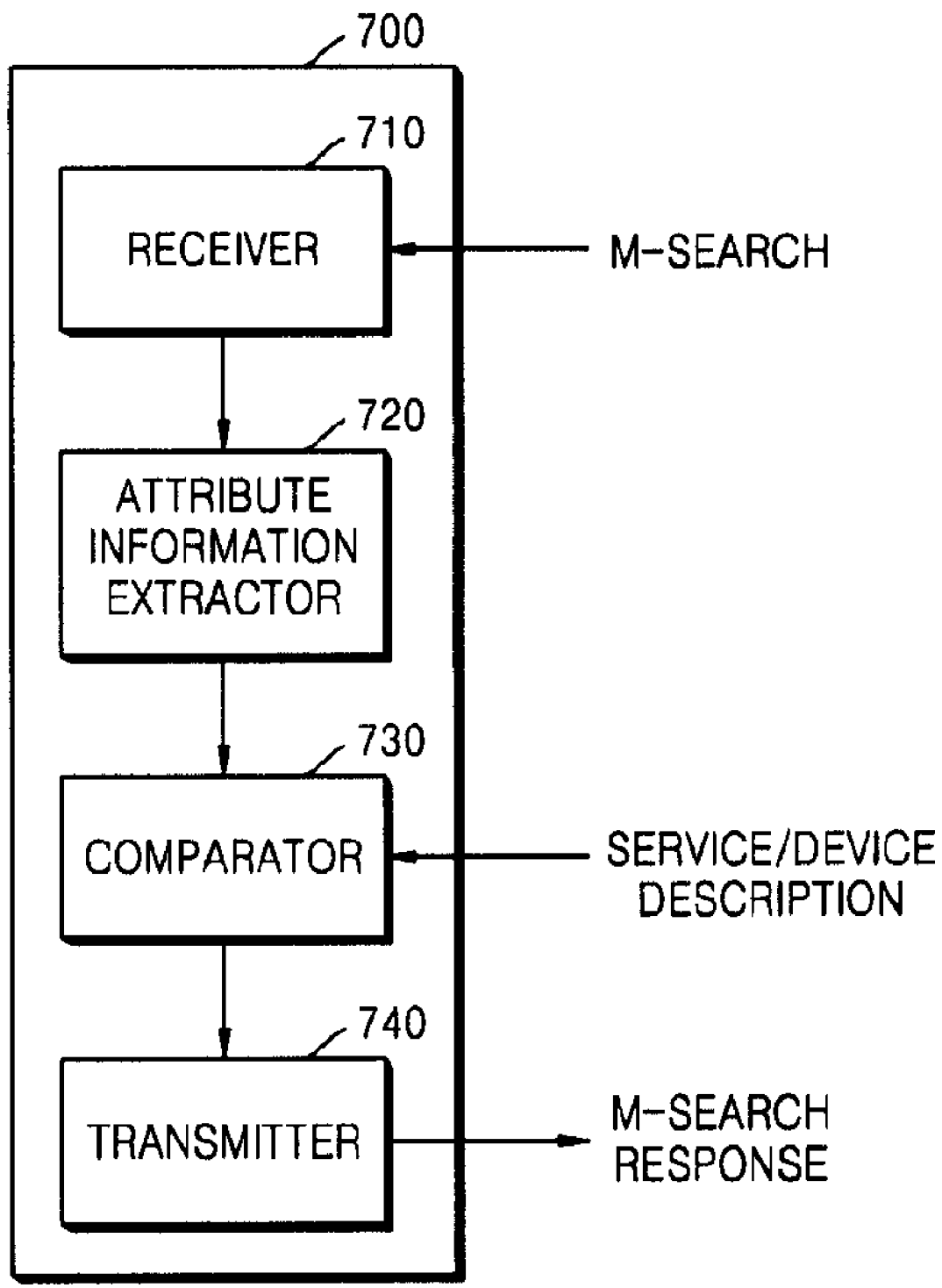
FIG. 7 is a view illustrating a structure of a UPnP device according to an exemplary embodiment of the present invention.

FIG. 7 is a view illustrating a structure of a UPnP device 700 according to an exemplary embodiment of the present invention.

Referring to FIG. 7, the UPnP device 700 according to the exemplary embodiment of the present invention includes a receiver 710, an attribute information extractor 720, a comparator 730, and a transmitter 740.

The receiver 710 receives the search message multicasted to UPnP devices and transmits the search message to the attribute information extractor 720.

The attribute information extractor 720 extracts attribute information from the received search message. Specifically, the attribute information extractor 720 analyzes an M-Search message to extracts an <ST> header value or an <SA> header value.

The comparator 730 compares the extracted attribute information with a service description or a device description. Specifically, the comparator 730 retrieves a specific tag of the service description or the device description by using a name of an attribute included in the attribute information as index information. When the tag is retrieved, the value of the attribute included in the attribute information is compared with the corresponding tag value of the service description or the device description, and it is determined whether or not an attribute desired by the user and an attribute of the UPnP device 700 are equal to each other.

As a result of the comparing of the comparator 730, when it is determined that the UPnP device 700 has the attribute designated in the search message, the transmitter 740 transmits a response message for the search message to the control point.

FIGS. 8A and 8B are views illustrating structures of a device description and an M-search message according to an exemplary embodiment of the present invention.

In FIG. 8A, the structure of the device description for a UPnP device (hereinafter, referred to as an A device) according to the exemplary embodiment is illustrated. As illustrated in FIG. 8A, the device description of the A device includes information on various attributes of the A device by using tags such as <deviceType>, <friendlyName>, <manufacturer>, and the like.

In FIG. 8B, the structure of the M-search message for searching for the A device is illustrated. According to the exemplary embodiment as illustrated in FIG. 8B, an <SA> header that is newly defined according to the exemplary embodiment of the present invention is used. Specifically, an <ST> header indicates that a type of the UPnP device to be searched for is MediaServer, and the <SA> header indicates that a "friendlyName" attribute of the UPnP device to be searched for is "Media Server in Alan's Room". Therefore, a name of the attribute is "friendlyName", and a value of the attribute is "Media Server in Alan's Room". Here, the "friendlyName" used as the name of the attribute may be the same as one of tags of the device description illustrated in FIG. 8A.

Therefore, the A device detects a <friendlyName> tag from the device description illustrated in FIG. 8A, compares a value of the tag with the value of attribute illustrated in FIG. 8B, and since the values are equal to each other as "Media Server in Alan's Room", transmits a response message to the control point.

When the A device is searched in a related art, all media servers in a UPnP network are searched, and device description documents for the searched media servers are acquired, all of the device description documents are analyzed, and a UPnP device having a value of a tag of <friendlyName> as "Media Server in Alan's Room" is detected.

However, according to the exemplary embodiment of the present invention, network traffic that occurs in an operation of searching for a UPnP device by the control point can be reduced, and a UPnP device desired by a user can be easily and rapidly searched for.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and an optical recording media (e.g., CD-ROMs, or DVDs).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of searching for a Universal Plug and Play (UPnP) device, comprising:
   generating a search message including information indicating one or more attributes of the UPnP device; and
   multicasting the generated search message to a UPnP network,
   wherein the information indicating the attributes indicates a name of the attribute by using a tag name used in a device description or a service description, and a value of the attribute,
   wherein the search message is a Multicast-search (M-search) message, and
   wherein the information indicating the attributes is included in a Search Target (ST) header or a newly defined header of the M-Search message.

2. The method of claim 1, wherein the M-search message comprises a Search Target (ST) header and a Search Attribute (SA) header, and the information indicating the attributes is included in the SA header of the M-Search message.

3. A non-transitory computer-readable medium having stored, thereon a computer program for executing a method of searching for a Universal Plug and Play (UPnP) device, the method comprising:
   generating a search message including information indicating one or more attributes of the UPnP device; and
   multicasting the generated search message to a UPnP,
   wherein the information indicating the attributes indicates a name of the attribute by using a tag name used in a device description or a service description, and a value of the attribute,
   wherein the search message is a Multicast-search (M-Search) message, and wherein the information indicating the attributes is included in a Search Target (ST) header or a newly defined header of the M-Search message.

4. An apparatus for searching for a UPnP device, comprising:
   a search message generator which generates a search message including information indicating one or more attributes of the UPnP device; and
   a transmitter which multicasts the generated search message to a UPnP network,
   wherein the information indicating the attributes indicates a name of the attribute by using a tag name used in a device description or a service description, and a value of the attribute,
   wherein the search message is a Multicast-search (M-Search) message, and
   wherein the information indicating the attributes is included in a Search Target (ST) header or a newly defined header of the M-Search message.

5. A method of processing a search message received by a Universal Plug and Play (UPnP) device, comprising:
   extracting attribute information from the search message;
   comparing the extracted attribute information with a device description or a service description of the UPnP device; and
   selectively transmitting a response message for the search message according to a result of the comparing,
   wherein in the comparing the extracted attribute information with a device description or a service description of the UPnP device, a value of a tag having the same name as a tag name included in the attribute information from among tags in the device description or in the service description is compared with an attribute value included in the attribute information,
   wherein the search message is a Multicast search (M-Search) message, and
   wherein the extracting is performed with reference to a search target (ST) header or a newly defined header of the M-Search message.

6. A non-transitory computer-readable medium having stored, thereon a computer program for executing a method of processing a search message received by a Universal Plug and Play (UPnP) device, the method comprising:
   extracting attribute information from the search message;
   comparing the extracted attribute information with a device description or a service description of the UPnP device; and
   selectively transmitting a response message for the search message according to a result of the comparing,
   wherein in the comparing the extracted attribute information with a device description or a service description of the UPnP device, a value of a tag having the same name as a tag name included in the attribute information from among tags in the device description or in the service description is compared with an attribute value included in the attribute information,
   wherein the search message is a Multicast search (M-Search) message, and
   wherein the extracting is performed with reference to a search target (ST) header or a newly defined header of the M-Search message.

7. An apparatus for processing a search message received by a Universal Plug and Play (UPnP) device, comprising:
   an attribute information extractor which extracts attribute information from the search message;
   a comparator which compares the extracted attribute information with a device description or a service description of the UPnP device; and
   a transmitter which transmits a response message for the search message according to a result of the comparing,
   wherein the comparator compares a value of a tag having the same name as a tag name included in the attribute information from among tags in the device description or in the service description with an attribute value included in the attribute information,
   wherein the search message is a Multicast search (M-Search) message, and
   wherein the extractor extracts the attribute information with reference to a search target (ST) header or a newly defined header of the M-Search message.

* * * * *